United States Patent [19]
Lowell et al.

[11] 3,783,697
[45] Jan. 8, 1974

[54] METHOD OF DETERMINING SMALL SURFACE AREAS

[76] Inventors: Seymour Lowell, 42 Wood Hollow Rd., Albertson, N.Y. 11507;
Stewart Karp, 67 Hickory Ln., Roslyn Heights, N.Y. 11577

[22] Filed: June 20, 1972

[21] Appl. No.: 264,461

[52] U.S. Cl. ............................................. 73/432 PS
[51] Int. Cl. ............................................. G01n 15/08
[58] Field of Search ................................. 73/432 PS

[56] References Cited
UNITED STATES PATENTS
3,211,006  10/1965  Haley, Jr. ......................... 73/432 PS
2,960,870  11/1960  Nelsen et al. .................... 73/432 PS Primary Examiner—Richard C. Queisser
Assistant Examiner—Joseph W. Roskos
Attorney—Bauer and Amer

[57] ABSTRACT

As an improvement over the method of U.S. Pat. No. 3,555,912 which uses flowing mixtures of adsorbate and inert diluent gases to develop surface measurement data, the within improved method further advances this technique by utilizing a cell, which contains the powder sample being measured, of an appropriate design to overcome errors which are found when low surface areas are measured. One optimum consequence using the improved cell hereof is that the measuring gaseous mixture is forced through the mass of the powder sample, thus controllably confining the surface area thereof being measured to the surface bounding the internal voids of the powder sample.

2 Claims, 3 Drawing Figures

PRIOR ART

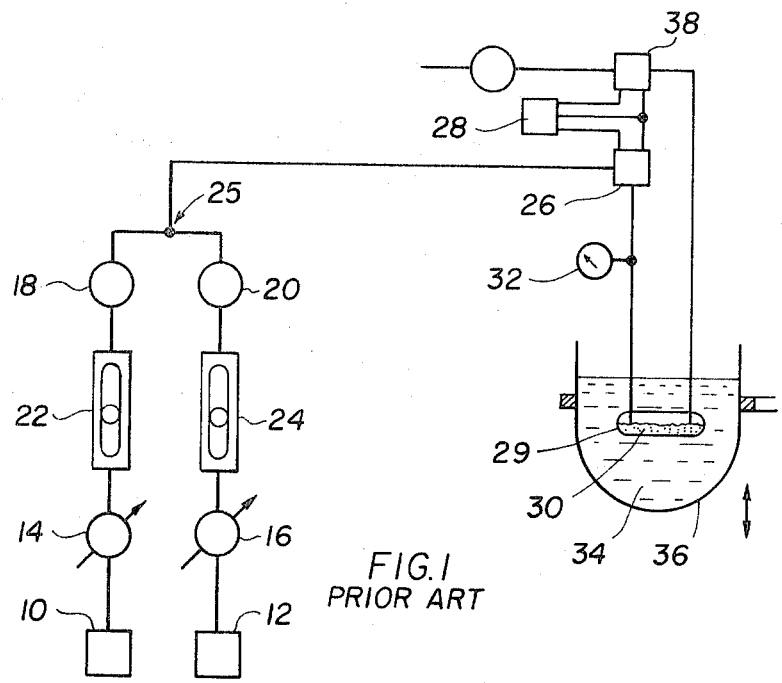
FIG.1
PRIOR ART
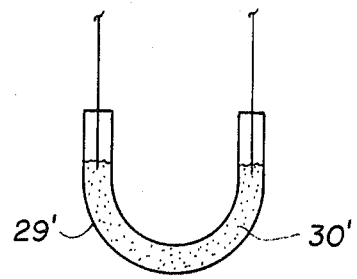
FIG.2
| WEIGHT (g) | ACTUAL AREA (m²) | MEASURED AREA (m²) | DEVIATION (%) |
|---|---|---|---|
| 1.305 | 5.07 | 5.07 | 0 |
| 0.739 | 2.87 | 2.87 | 0 |
| 0.378 | 1.47 | 1.45 | -1.3 |
| 0.177 | 0.687 | 0.686 | -0.14 |
| 0.089 | 0.345 | 0.327 | -5.5 |
| 0.049 | 0.190 | 0.166 | -12.6 |
| 0.0190 | 0.0730 | 0.0481 | -34.1 |
| 0.0101 | 0.0394 | 0.0192 | -51.3 |
FIG.3
PRIOR ART

METHOD OF DETERMINING SMALL SURFACE AREAS

The present invention relates to improvements in obtaining surface measurement data using the technique of exposing said surface to a flowing gas mixture of an adsorbate and an inert diluent, and ore particularly to a significantly facilitated method of accurately measuring quantities of powder samples having low or small surface areas.

It is already well known that gas adsorption can advantageously be used to obtain surface measurement data. For example, assuming that nitrogen is the adsorbate, it is known that one cubic centimeter of this gas at 25° C. at one atmosphere of pressure and further existing as a mono-layer adsorbed to the test powder surface will cover approximately 2.84 square meters of that test surface. The foregoing is the basis of measuring techniques using nitrogen or a similar adsorbent to determine the area of powder surfaces that are comprised of many particles. These techniques are generally disclosed in the patent literature, as for example in the NELSEN et al. U.S. Pat. No. 2,960,870 and LOWELL et al. U.S. Pat. No. 3,555,912.

Heretofore, putting to practice the aforesaid techniques with low or small surfaces has not produced accurate measurements. Thus, although it is desirable to use the continuous flow technique, with nitrogen as the adsorbate, for greater accuracy resort is often made to the more cumbersome krypton adsorption method for low area measurements.

Broadly, it is an object to provide a facilitated method of determining low surface areas by the continuous flow method overcoming the foregoing and other shortcomings of the prior art. More particularly, it is an object to develop low surface measurement data using to advantage the technique of exposing the test surface to flowing mixtures of adsorbate and inert diluent gases, and insuring a high degree of reliability to said data by utilizing a cell to contain the low surface area powder of such geometry, i.e., restricted flow passage, as to minimize or eliminate the shortcomings of the prior art. That is, eliminated as a major source of error is the separation of the inert carrier gas from the adsorbate gas in the temperature gradient established when the cell is immersed in the coolant. Said separation of gases causes an erroneous signal to be generated which obscures the signal due to adsorption of the adsorbate on the test sample. This erroneous signal is of such magnitude in conventional cells that is only apparent when measuring low surface areas.

The method of determining flow surface measurements which demonstrate objects and advantages of the present invention contemplates the practice thereof using an optimum designed cell bounding a shaped and constricted flow passage which lacks the volume to permit said separation of carrier and adsorbate gases. One typical consequence of said optimum designed cell is that it results in exposing only the test sample internal surfaces which bound the internal voids of the sample to measurement, said surfaces not being subject to unpredictable deviation and therefor the measurement data thereof is highly reliable, even in the case of low or small test surfaces.

The above brief description, as well as further objects, features and advantages of the present invention, will be more fully appreciated by reference to the following detailed description of the improved method of the present invention using the exemplary apparatus illustrated in the accompanying drawings, to wit:

FIG. 1 is a diagrammatic illustration of surface-measurement apparatus;

FIG. 2 is an elevational view, on an enlarged scale, illustrating the material preparatory to the measurement thereof which demonstrates the improved techniques of the present invention; and FIG. 3 is a chart demonstrating surface area measurements using prior art techniques.

Reference is now made to FIG. 1 wherein there is shown an exemplary embodiment of apparatus for performing surface measurements with a test powder surface using an adsorbate and an inert gaseous diluent mixture. For example, assuming that nitrogen is the absorbate, it is known that one cubic centimeter of this gas at 25° C. at one atmosphere of pressure and further existing will cover approximately 2.84 square meters of that test surface. The foregoing is the basis of measuring techniques using nitrogen or a similar adsorbent to determine the size of powder surfaces that are comprised of billions of particulate material. These techniques are generally disclosed in the patent literature, as for example in the NELSEN et al. U.S. Pat. No. 2,960,870 and in the LOWELL et al. U.S. Pat. No. 3,555,912.

At the inlet or upstream end of the system depicted in FIG. 1, the adsorbate and diluent gases are separately introduced into the lines 10 and 12 respectively. Needle valves 14 and 16 are used to control the individual gas flows while on-off valves 18 and 20 are used to start and stop the gas flows.

Flow meters 22 and 24 in their respective lines 10 and 12 indicate the rates of flow. The gas flows merge at the T-connection 25 and flow as a mixture through the remainder of the system.

The mixture flows initially through detector 26, typically comprising a thermal conductivity cell, which forms part of a conventional wheatstone bridge circuit. This bridge circuit is connected to a suitable measuring device 28, as indicated, which may be a recording potentiometer or the like. After leaving the first detector 26, the gas stream flows through a cell 29 containing a powder sample 30.

It will be noted that a pressure gauge 32 is included in the system. This gauge measures the equilibrium vapor pressure of the adsorbate. This latter measurement is made by purging the entire system with the adsorbate. Thus, with the sample cell 29 immersed in a coolant 34 (e.g., liquid nitrogen) contained in a flask 36, the pressure is allowed to build up in the system in order to liquify the adsorbate in the sample cell. Subsequently, said pressure is relieved, in any appropriate manner, and the liquid adsorbate will commence to boil, whereby the vapor will flow into the gauge 32. Gauge 32 will then indicate the saturated equilibrium vapor pressure of the adsorbate. As a result of obtaining the saturated vapor pressure in this manner, much greater accuracy is obtained in determining surface areas.

As indicated in FIG. 1, a conventional detector 38, similar to detector 26, is used to measure the exiting flow concentration, and in particular the amount of adsorbate (i.e. nitrogen) desorbed from the powder sample 30 and constitutes the second leg of the wheatstone bridge circuit.

In a manner which is well understood, and in particular which is described in detail in our prior U.S. Pat. No. 3,555,912 for constructing either the adsorption or desorption isotherm, it is necessary to obtain serveral data points in order to construct the correct curves. Each data point is obtained with a different nitrogen pressure, this pressure being determined by the appropriate setting of the flow control valves 14 and 16. For a selected gas mixture, measurement is made of the amount of nitrogen adsorbed from said gas mixture and subsequently desorbed from the powder sample 30. The amount of nitrogen desorption is measured using the previously noted recording potentiometer 28 or similar measuring device.

As an example, let certain specific values be considered. Thus, with the sample immersed in the coolant 34, helium gas is used to purge the entire system. Then the flow is adjusted to obtain a relative pressure of nitrogen of 0.1. The system is purged with this new mixture. When the recorder 28 arrives at a constant base line, it is known that the new mixture has flushed out the previous mixture which in the assumed example was pure helium. Removal of the fluid 34 subjects the powder sample 30 with adsorbed nitrogen to ambient temperature of, for example, 25° C., which then results in desorption of the adsorbed nitrogen from the powder sample 30.

The adsorption and desorption isotherm curves are then derived from several data points obtained in a manner just described. Further, from these curves, it is readily possible to determine by well understood calculations the surface area of the powder sample 30.

Heretofore, however, the method just described was known not to produce accurate results when measuring small powder surface areas. Using the apparatus of FIG. 1, and also using J. T. Baker Company's zero grade nitrogen and helium as the adsorbate and inert gases, respectively, and mixtures thereof, also supplied by this company, guaranteed in their compositions to 1 percent relative, measurements were made of a zinc oxide powder sample 30 obtained from New Jersey Zinc Co. which reported the specific surface area of the sample as 3.80m²/g. These measurements were made in cell 29 of FIG. 1. Cell 29, being typical of the prior art, had a horizontal region of comparatively larger volume than the volume or mass of powder sample 30 being measured. In our experiments, the size of this horizontal cell region was 12mm at its inside diameter, 3cm long, and thus bounded a volume of about 3.4 cc.

The table of FIG. 3 shows the results of determinations of the areas of varying quantities of said zinc oxide sample 30 using said conventional cell 29, and compares these results with the actual areas calculated from the known specific surface area 3.80m²/g of the powder sample. As clearly indicated, the percent deviation or error increases as the sample quantity is decreased, being in excess of 50 percent for the relatively small sample of 0.0101g.

The foregoing deviation experience developed in connection with zinc oxide was found to be also typical of measurements of low areas of other adsorbents, such as alumina, charcoal, silica and several other organic substances, while using the typical prior art cell 29.

An unobvious and surprising solution to the foregoing dilemma, i.e. measurement deviations using prior art cell 29, has resulted from use of cell 29' while using all other apparatus in the manner already described in connection with FIG. 1. That is, by substituting cell 29' for cell 29 in the apparatus set-up of FIG. 1, and operating the same to obtain surface measurements in the manner already described, we were able to eliminate significant deviation, even for the small sample of 0.0101g.

In contrast to cell 29, cell 29' was of a selected design so that the internal volume which is bounded did not allow for the separation of the carrier and adsorbate gases, even with the cell 29' empty. In other words, the gases sweep each other through the cell 29', whereas the excessive size and shape of cell 29 contribute to separation and the interference thereof with surface measurement procedures.

FIG. 2 illustrates the test environment typically provided by improved cell 29'. Preparatory to making surface measurements, the powder sample 30' is in actual surface contact with the interior wall bounding the interior volume of cell 29', as clearly illustrated in FIG. 2. This was achieved using a simple circular U-tube, as illustrated in FIG. 2 with these dimenisons: 2mm at its inside diameter, 11.5cm high, and having about a 3cm separation between arms.

The contribution of cell 29' to the practice of the improved method of measuring small surface areas is believed to reside in the manner in which it prevents the adsorbate or carrier gases from separating in a thermal gradient. Using this smaller diameter with no region of high volume, there exists no volume into which the heavier nitrogen gas (adsorbate) can settle or collect. As a further aid in preventing settling or entrapment of the adsorbate, cell 29' is typically filled with powder, being of constricted size, and thus the gas mixture is actually forced through the mass of the powder sample 30' or, in other words, through the internal voids thereof which, of necessity, constitute the only available flow passage and further reduces the volume into which the adsorbate can be entrapped. The measured nitrogen is thus whatever quantity of nitrogen that is adsorbed by the powder surfaces bounding these internal voids and it cannot be confused with the nitrogen which was separated from the mixture in the thermal gradient. It is believed that the manner in which the prior art cell 29 presents the powder sample for surface measurement, is such that there will, of course, be measurement of the exposed powder sample surface and also an unpredictable measurement due to the volume at the base of the prior art cell into which the nitrogen can settle due to the thermal gradient established when the cell is immersed in a coolant. The latter produces the measurement deviations of the table of FIG. 3, these deviations being understandably greater percentage-wise for smaller powder samples. The improvements to the surface measuring method, proposed according to the present invention, thus reside in eliminating spurious signals due to the tendency of the heavier adsorbate gas to separate in a thermal gradient, and one simple way of doing this, as described herein, is to use a simple U-tube 29' filled with material 30', as illustrated in FIG. 2.

A latitude of modification, change and substitution is intended in the foregoing disclosure, and in some instances some features of the invention will be employed without a corresponding use of other features. Accordingly, it is appropriate that the appended claims be construed broadly and in a manner consistent with the spirit and scope of the invention herein.

What is claimed is:

1. For a material having a first external surface and internal voids bounded by a second internal surface, a method of determining the surface areas of said material during which an adsorbate and an inert gaseous diluent are passed in adsorbing contact with said material, the improvement to said method comprising the steps of establishing a flow passage having a reversal in direction for said adsorbate and inert gaseous diluent with U-shaped wall means bounding a selected volume, filling said U-shaped flow passage with a quantity of said material which entirely occupies said selected flow passage volume such that there is surface contact between said material and said bounding wall means, and flowing said adsorbate and inert gaseous diluent through the mass of said material filling said U-shaped flow passage to establish said adsorbing contact only with said second internal surface area of said material bounding said internal voids, whereby surface area measurement is confined to that of said second internal surface to the exclusion of said first internal surface to thereby minimize errors in measuring small surface areas.

2. The improved method of determining surface area as defined in claim 1 wherein the flow passage is circular in cross section.

* * * * *

UNITED STATES PATENT OFFICE
CERTIFICATE OF CORRECTION

Patent No. 3,783,697            Dated January 8, 1974

Inventor(s) Seymour Lowell and Stewart Karp

It is certified that error appears in the above-identified patent and that said Letters Patent are hereby corrected as shown below:

In the Claims:

Column 6

Claim 1.   8th line, change "internal" to "external"

Claim 2.   11th line, change "the" to "said"

Signed and sealed this 26th day of November 1974.

(SEAL)
Attest:

McCOY M. GIBSON JR.                C. MARSHALL DANN
Attesting Officer                  Commissioner of Patents